Aug. 15, 1944.  R. J. BEGGS  2,355,944
ORNAMENTAL CHAIN
Filed April 26, 1943  2 Sheets-Sheet 1

Inventor
Robert J. Beggs,
By Stone, Boyden & Mack,
Attorneys.

Aug. 15, 1944.   R. J. BEGGS   2,355,944
ORNAMENTAL CHAIN
Filed April 26, 1943   2 Sheets-Sheet 2

Inventor
Robert J. Beggs,
By Stone, Boyden Mack,
Attorneys

Patented Aug. 15, 1944

2,355,944

UNITED STATES PATENT OFFICE 2,355,944

ORNAMENTAL CHAIN

Robert J. Beggs, Highland Springs, Va.

Application April 26, 1943, Serial No. 484,609

10 Claims. (Cl. 59—83)

This invention relates to chains, and more particularly to ornamental chains adapted especially for use in the jewelry art for bracelets, arm bands and the like.

One object of the invention is to provide an improved chain of this character comprising a series of closed links which may be readily assembled as desired by simple interlocking, without the use of solder or tools, and without requiring any bending or other deforming operation.

Another object is to provide an improved construction by which the links interlock so securely that the possibility of accidental disengagement is practically eliminated.

Still another object is to devise an improved clasp, for connecting the ends of such chain, said clasp being constructed to interlock with the end links of the chain in much the same manner as the links interlock with each other.

A still further object of the invention is to produce a chain of artistic design and exceptionally attractive appearance.

In order that the invention may be readily understood, reference is had to the accompanying drawings, forming part of this specification, and in which.

Figure 1:
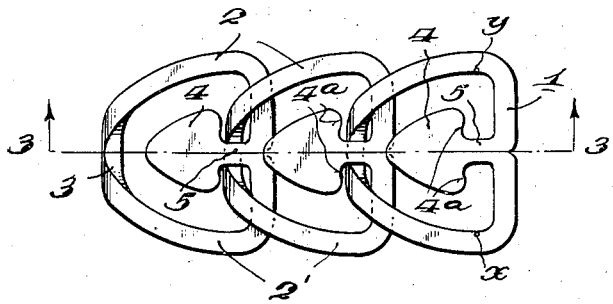
Fig. 1 is a plan view of three of my improved links assembled to form a chain.
Figure 2:
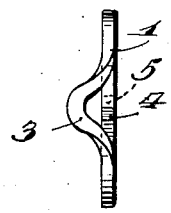
Fig. 2 is an end view of one of the links.
Figure 3:
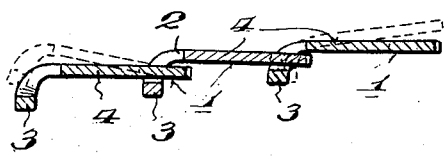
Fig. 3 is a section substantially on the line 3—3 of Fig. 1, looking in the direction of the arrows.
Figure 4:
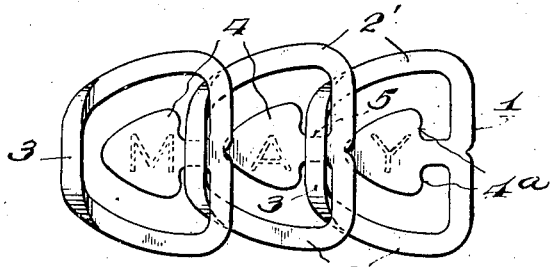
Fig. 4 is a plan view similar to Fig. 1, but showing the reverse side of the links.

Referring to the drawings in detail, and more particularly first to Figs. 1 to 7, my improved chain is made up of a series of connected or interlocked closed links 1. Each of these links is illustrated in Figs. 1 and 4 as an approximately heart-shaped open frame having a wide end or base and a pair of side portions 2 and 2' connecting such base with the small end or point of the heart-shaped structure. Each of these links is preferably die cut from flat stock. Projecting inwardly from the inside edge of the base or wide end of each link is a head or tongue 4 connected with the base by means of a relatively narrow neck 5. This tongue 4 lies substantially in the same plane as the side portions of the link, while the small end or point 3 of the link is bent sharply out of this plane, preferably into a plane at substantial right angles thereto, as best shown in Figs. 2 and 3.

The side portions 2 and 2' of each link are preferably arcuate, the arc of the side 2 being struck from a center $x$ and the arc of the side 2' being struck from the center $y$, these two centers lying approximately on the respective opposite arcs.

The side edges of the tongue 4 are also arcuate, being struck about the same centers, and are therefore substantially parallel with the adjacent side portions of the link, being separated therefrom by a space somewhat wider than the width of the side portions themselves.

As shown in Figs. 1 and 4, the links are united or connected to form a chain by causing the bent small end of one link to engage around and embrace the neck 5 of the adjacent link, the two links being held in such interlocked relation by means of shoulders 4$^a$ projecting at either side of the neck 5.

When so assembled, the links are capable of considerable pivotal movement relative to each other, as indicated by dotted lines in Fig. 3, so that the chain is flexible and can bend sufficiently to freely encircle the wrist. In practice, the side of the chain shown in Fig. 4 is the outside, while Fig. 1 illustrates the under side of the chain, which is in contact with the wrist.

Figure 5:
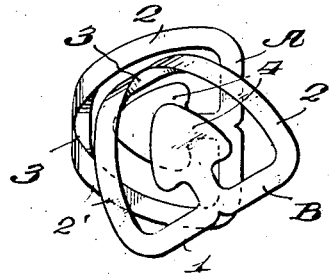
Figs. 5, 6 and 7 are plan views illustrating the successive steps employed in assembling two links.
Figure 6:
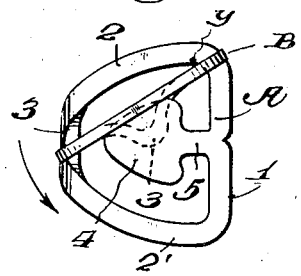
Figure 7:
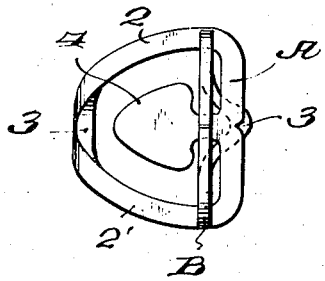

The method of assembling the links is illustrated in Figs. 5, 6 and 7, in which two similar links have been designated A and B. The first step is to insert the bent point 3 of link B into the space between one of the side members 2 and the tongue 4 of the link A, the two links lying in parallel planes, as illustrated in Fig. 5. After this has been done, link B is tilted upwardly to a position at right angles to link A, as shown in Fig. 6, with the bent end 3 of the link B underlying the tongue 4 of link A. Having reached this position, the link B is then swung substantially about the point Y as a center, and in a direction as indicated by the arrow in Fig. 6, into the position shown in Fig. 7. All that remains is to then swing the link B downwardly to the right, into the position shown in Fig. 1, in which position it will be seen that the end 3 passes under the neck 5 of the adjacent link, and is confined between the base of the link and the shoulders 4ª of the tongue.

In practice, it is proposed to stamp or engrave some letter of the alphabet upon the tongue 4 of each link, as indicated in dotted lines in Fig. 4. A jeweler would then carry in stock an assortment of separate links all bearing different letters, so that links may be selected and assembled and arranged so as to spell any desired word or name. The use of such preformed letters, which may be assembled as desired, thus obviates the necessity of the special engraving which is usually required in order to produce individual names or initials upon articles of jewelry.

Two types of wrist bands or bracelets are in common use, namely, that usually known as the "Ladies' style" consisting of a continuous band, and that known as the "Gentlemen's" or "Signet" type, in which a watch, locket or other ornament is interposed between the ends of the band.

Figure 8:
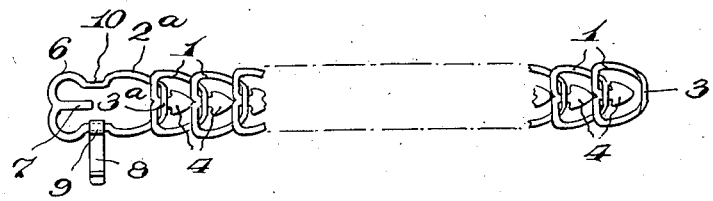
Fig. 8 is a plan view on a reduced scale showing a bracelet formed of my improved links and also illustrating a clasp for uniting the ends of the bracelet band.
Figure 9:
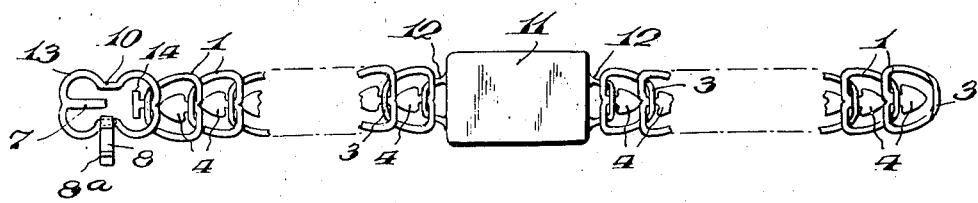
Fig. 9 is a similar view showing the method of using my improved links when employed as a wrist band for holding a watch, locket, or the like, and illustrating a somewhat modified form of clasp.

The first of these types is illustrated in Fig. 8, and the second in Fig. 9.

By comparing these figures, it will be seen that in Fig. 8 the links all point in the same direction, while in Fig. 9, they point in opposite directions.

In Fig. 8, I have shown a special clasp designed to unite the ends of a continuous band formed of my improved links. This clasp is quite similar in general to the links and comprises an open frame 6 having a tongue 7 projecting inwardly from one end thereof. The opposite end of this frame is reduced to a width substantially equal to the width of a link, and such end is then bent over out of the plane of the frame, in the same manner as illustrated in Fig. 3 in connection with the links. In use, this bent over end 3ª of the frame of the clasp is interlocked with the tongue 4 of the adjacent link in the same manner that two links are interlocked with each other. In connecting the two ends of the band or bracelet, therefore, the bent over portion 3 of the end link, shown at the right in Fig. 8, is hooked over the tongue 7 of the clasp 6. In order to hold the parts in this position and prevent disengagement, I provide a locking bar 8 pivoted at one end 9 to the mid portion of the clasp and adapted to be swung over into engagement with a similar portion 10 at the opposite side of the clasp, this bar 8 extending across the clasp at a point adjacent the end of the tongue 7 so as to prevent the link from slipping off.

Figure 11:
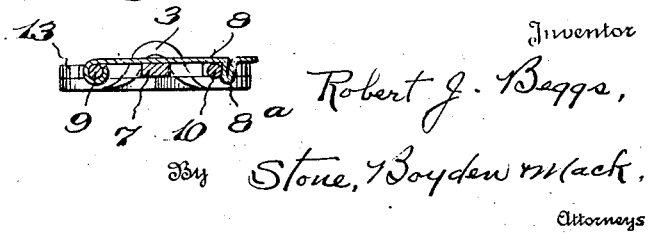
Fig. 11 is a transverse section substantially on the line 11—11 of Fig. 10, looking in the direction of the arrows.

By reference to Fig. 11, which shows a similar construction, it will be seen that the bar 8 is provided with a resilient fold or lug 8ª adapted to snap over and frictionally engage the portion 10 of the clasp.

Figure 10:
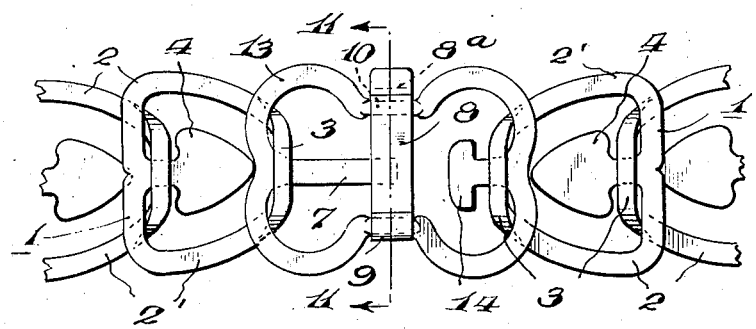
Fig. 10 is a view on an enlarged scale showing the clasp illustrated in Fig. 9 after the two ends of the band have been connected therewith.

Referring now to Figs. 9 and 10, I have illustrated a watch, locket or the like at 11, this being provided at its opposite ends with fixed loops 12. These loops are formed in a manner similar to the small end of the chain links, and in use one of the links is interlocked with each of the loops 12, by passing the tongue 4 therethrough, as shown. Because of this, it will be seen that the tongues of each series of links point away from the watch or locket, that is to say, they point in opposite directions on opposite sides of such watch or locket. Consequently, it is necessary to provide a clasp which is so constructed as to engage and interlock with the bent over portions of the end link of each series.

This improved clasp is designated in its entirety by the numeral 13, and comprises a substantially symmetrical frame of the same width at both ends. Projecting inwardly from one end is a tongue 7 similar to that of the clasp 6, and projecting inwardly from the opposite end is a special tongue 14, having a head or shouldered portion at its end. The turned over end 3 of the adjacent link of the chain is interlocked with the tongue 14, as shown in Fig. 10, and by virtue of the shouldered construction of this tongue, accidental disengagement of this link is effectively prevented. The turned over portion 3 of the other end link is hooked over the tongue 7 and is prevented from disengagement therewith by a locking bar 8 similar in all respects to that described in connection with the clasp 6. Fig. 11 clearly shows the construction of this locking bar, pivoted at one end on the rounded mid portion of the frame, as indicated at 9, and adapted to snap over a similar rounded portion 10 at the other side of the frame.

From the foregoing, it will be seen that I have provided an improved construction of link which lends itself readily to any type of band or bracelet, which may be readily assembled as desired without the use of tools or solder, and which, when assembled, is securely interlocked against accidental disengagement, and it is thought that the many advantages of the invention will be readily appreciated by those skilled in the art.

What I claim is:

1. A chain formed of a series of detachably connected closed links, each link being made from flat stock and comprising a heart-shaped frame having a tongue projecting from the inside edge of the base thereof and lying substantially in the plane of the sides of the link, the point of the link being bent out of such plane into a position at substantial right angles thereto, the adjacent sides of said link and tongue being substantially parallel and separated by a space at least equal to the width of the side portions of the link, and said tongue being connected with the base of the link by a relatively narrow neck, the bent point of one link being interlocked over the tongue and embracing the neck of the next link.

2. A chain formed of a series of detachably connected closed links, each link being made from flat stock and comprising an open frame having a tongue projecting from the inside edge of one end into the interior thereof and lying substantially in the same plane, the opposite end of the link being bent out of said plane, said bent end of one link embracing and being interlocked with the tongue of the next.

3. A chain formed of a series of detachably connected closed links, each link being made from flat stock and comprising an open frame having a shouldered tongue projecting from the inside edge of one end into the interior thereof, and lying substantially in the same plane, said tongue having a relatively narrow neck portion between said end and the shoulder, the opposite end of said link being bent out of said plane, said bent end of one link embracing the neck portion of the next link and being held against displacement by engagement with the said shoulder.

4. A chain formed of a series of detachably connected closed links, each link being made from flat stock and comprising an open frame having arcuate side portions, said frame having a tongue projecting into the interior thereof from the inside edge of one end and lying substantially in the same plane, the side edges of said tongue also being arcuate and disposed in spaced, substantially parallel relation with the adjacent side portions of said frame, the opposite end of said link being bent out of the plane of said tongue, and said bent end of one link being interlocked with the tongue of the next link.

5. A chain formed of a series of detachably connected closed links, each link being made from flat stock and comprising an open frame having arcuate side portions, the arc of one side portion being struck about a center lying substantially on the inner edge of the other side portion, said frame having a tongue projecting from the inside edge of one end into the interior thereof and lying substantially in the same plane, the side edges of said tongue being spaced from the adjacent side portions of said frame, the opposite end of said link being bent out of the plane of said tongue, and said bent end of one link being interlocked with the tongue of the next link.

6. A detachable chain element formed from flat stock, and comprising a one piece, closed frame having an open interior, a tongue projecting from the inside edge of one end of said frame into the interior thereof, said tongue and the sides of said frame lying in substantially the same plane, and the portions of said frame adjacent said tongue being arcuate, said tongue constructed and arranged to interlock and be connected with another chain element.

7. A detachable chain element formed from flat stock, and comprising a one piece, closed frame having an open interior, a tongue projecting from the inside edge of one end of said frame into the interior thereof, said tongue and the sides of said frame lying in substantially the same plane, and the other end of said element being bent out of said plane and constructed to embrace and interlock with the tongue of the next adjacent element.

8. In combination, a chain formed of a series of connected, closed links, each comprising an open frame having a tongue projecting from one end thereof and lying in substantially the same plane, and having its other end bent out of said plane and interlocked with the tongue of the next link, and a connecting clasp also comprising an open frame having at one end a tongue projecting into the interior thereof and constructed to be detachably engaged by the bent end of one end link of the series, and having at its other end means for attaching it to the other end link of the series.

9. In combination, a chain formed of a series of connected, closed links, each comprising an open frame having a tongue projecting from one end thereof and lying in substantially the same plane, and having its other end bent out of said plane and interlocked with the tongue of the next link, and a connecting clasp also comprising an open frame having at one end a tongue projecting into the interior thereof and constructed to be detachably engaged by the bent end of one end link of the series, and having its other end bent over and adapted to interlock with the tongue of the link at the other end of the series.

10. In combination, a chain made up of a series of connected, closed links, each comprising an open frame lying substantially in a single plane and having one end bent out of said plane and interlocked with the next adjacent link, and a connecting clasp for detachably connecting the ends of said chain, said clasp comprising a frame having side and end portions, a tongue projecting inwardly from one end portion of said frame and lying in substantially the same plane as the said side portions, said tongue being constructed to be engaged by the bent portion of the link at one end of the chain, means at the other end of said frame for attachment to the link at the other end of the chain, and a locking bar pivotally mounted on one side portion of said frame and constructed to detachably engage the opposite side portion, said bar extending across said frame at a point adjacent the inner end of said tongue so as to prevent the accidental disengagement of the chain link therefrom.

ROBERT J. BEGGS.